(12) United States Patent
McLaughlin et al.

(10) Patent No.: US 9,591,535 B2
(45) Date of Patent: Mar. 7, 2017

(54) DYNAMIC AUTOMATED NEIGHBOR LIST MANAGEMENT IN SELF-OPTIMIZING NETWORK

(71) Applicant: Eden Rock Communications, LLC, Bothell, WA (US)

(72) Inventors: Stephan McLaughlin, Bothell, WA (US); Dan Wellington, Bothell, WA (US)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 14/601,039

(22) Filed: Jan. 20, 2015

(65) Prior Publication Data

US 2015/0208300 A1 Jul. 23, 2015

Related U.S. Application Data

(63) Continuation of application No. 14/600,747, filed on Jan. 20, 2015.

(60) Provisional application No. 61/929,458, filed on Jan. 20, 2014.

(51) Int. Cl.
*H04W 36/00* (2009.01)

(52) U.S. Cl.
CPC ... *H04W 36/0083* (2013.01); *H04W 36/0088* (2013.01)

(58) Field of Classification Search
CPC ..... H04W 36/04; H04W 36/18; H04W 36/30; H04W 36/32
USPC ........................... 455/436–444; 370/331–334
See application file for complete search history.

(56) References Cited

U.S. PATENT DOCUMENTS

| | | | |
|---|---|---|---|
| 6,970,871 B1 * | 11/2005 | Rayburn | G06Q 30/02 |
| 7,969,910 B2 | 6/2011 | Barak et al. | |
| 2001/0041574 A1 * | 11/2001 | Bergenlid | H04W 16/18 455/452.2 |
| 2004/0152480 A1 | 8/2004 | Willars et al. | |
| 2004/0242158 A1 * | 12/2004 | Fattouch | H04W 16/18 455/63.1 |
| 2007/0037577 A1 | 2/2007 | Dalsgaard et al. | |
| 2009/0061871 A1 | 3/2009 | Gross et al. | |
| 2009/0092080 A1 * | 4/2009 | Balasubramanian | H04J 11/0093 370/328 |
| 2009/0098873 A1 | 4/2009 | Gogic | |

(Continued)

FOREIGN PATENT DOCUMENTS

WO  WO 2013/160708 A1  10/2013

OTHER PUBLICATIONS

International Search Report and Written Opinion for PCT/US2015/012040, filed Jan. 20, 2015.

*Primary Examiner* — Anthony Addy
*Assistant Examiner* — Matthew Genack

(57) ABSTRACT

Systems and methods for dynamically modifying neighbor lists for cells within telecommunications networks and/or modifying neighbor lists based on determined radio frequency coupling between cells are described. In some embodiments, the systems and methods access a neighbor list associated with a target cell or associated with one or more neighbor cells of the target cell within a network, apply one or more dynamic optimization rule sets to the target cell, and modify a neighbor list associated with the target cell or with neighbor cells to the target cell based on the applied rule sets.

13 Claims, 14 Drawing Sheets

(56) References Cited

U.S. PATENT DOCUMENTS

| | | |
|---|---|---|
| 2009/0135730 A1 | 5/2009 | Scott et al. |
| 2009/0247159 A1 | 10/2009 | Flore et al. |
| 2010/0278161 A1 | 11/2010 | Ore et al. |
| 2011/0122761 A1 | 5/2011 | Sriram |
| 2011/0149921 A1 | 6/2011 | Shin et al. |
| 2012/0140658 A1* | 6/2012 | Kanzaki ............... H04B 7/0426 370/252 |
| 2013/0237201 A1 | 9/2013 | Futaki |
| 2014/0113666 A1 | 4/2014 | Arvidsson et al. |
| 2014/0162678 A1* | 6/2014 | Song .................... H04L 5/0073 455/452.2 |
| 2015/0092552 A1 | 4/2015 | Bajj et al. |
| 2015/0155996 A1 | 6/2015 | Garcia |

\* cited by examiner

DYNAMIC AUTOMATED NEIGHBOR LIST MANAGEMENT IN SELF-OPTIMIZING NETWORK

CROSS-REFERENCES TO RELATED APPLICATIONS

This application claims priority to and is a continuation of U.S. patent application Ser. No. 14/600,747, filed Jan. 20, 2015, which claims priority to U.S. Provisional Application No. 61/929,458, filed on Jan. 20, 2014, entitled ENHANCED AUTOMATED NEIGHBOR LIST MANAGEMENT UTILIZING CASE SPECIFIC OPTIMIZATION AND GEOSCORING, both of which are hereby incorporated by reference in their entirety.

BACKGROUND

Wireless networks rely on a large number of individual base stations or cells to provide high capacity wireless services over large coverage areas, such as market areas (e.g., cities), surrounding residential areas (e.g., suburbs, counties), highway corridors and rural areas. Continuous radio connectivity across these large coverage areas is accomplished via user mobility from one base station to others as the user traverses the network's operating area. High reliability mobility in mobile wireless networks minimizes the number of dropped calls or other abnormal discontinuations of radio service to the supported users.

In order to maintain high reliability, a network manages neighbor lists, such as Neighbor Relations Tables, that define, for any given base station within the network, nearby network base stations that are likely or desired candidates for mobility handover. Therefore, accurate and well-optimized neighbor lists support a high network performance, as utilization of neighbor lists reduces the incidence of dropped calls and failed handovers between network cells.

Traditionally, neighbor lists have been manually optimized by network operations staff, although recent technologies have been developed that are capable of performing ongoing automated optimizations of neighbor lists within networks. For example, existing methods for Automatic Neighbor Relations based optimization (ANR) utilize common rules applied to all network cells, such as rules that define when to add, drop, reprioritize, and/or prohibit an addition of cells to a specific or target cell's neighbor list. These methods (e.g., methods which utilize handover counts or detected set reporting) provide a basic set of rules for automatically maintaining neighbor lists. However, such reliance on basic, shared ANR optimization often leads to poor or undesired performance in real world networks, such as networks with complex radio frequency propagation environments.

SUMMARY

Systems and methods for dynamically modifying neighbor lists for cells within telecommunications networks and/or modifying neighbor lists based on determined radio frequency coupling between cells are described.

In some embodiments, the systems and methods access a neighbor list associated with a target cell or associated with one or more neighbor cells of the target cell within a network, apply one or more dynamic optimization rule sets to the target cell, and modify a neighbor list associated with the target cell or with neighbor cells to the target cell based on the applied rule sets.

In some embodiments, the systems and methods determine that a cell within a telecommunications network is a missing neighbor problem cell that satisfies one or more problem cell criteria, apply one or more add rules to the determined problem cell, add one or more neighbor cells to a neighbor list of the determined problem cell based on the applied one or more add rules, and provide the neighbor list to an automated network relation process running within the telecommunications network.

In some embodiments, the systems and methods identify one or more neighbor cells on a neighbor list of a target cell as blacklist candidates, determine which of the blacklist candidates have characteristics that satisfy cell removal criteria, remove the blacklist candidates having characteristics that satisfy the cell removal criteria from the neighbor list of the target cell, and provide the neighbor list to an automated network relation process running within the telecommunications network.

In some embodiments, the systems and methods determine a coupling value for a source cell and a neighbor cell within a telecommunications network, and perform an action that is based on the determined coupling value. For example, the systems and methods may determine a geoscore for a source cell and a neighbor cell within a network, and add or remove the neighbor cell from a neighbor list of the source cell based on the determined geoscore.

DETAILED DESCRIPTION

Overview

Figure 1:
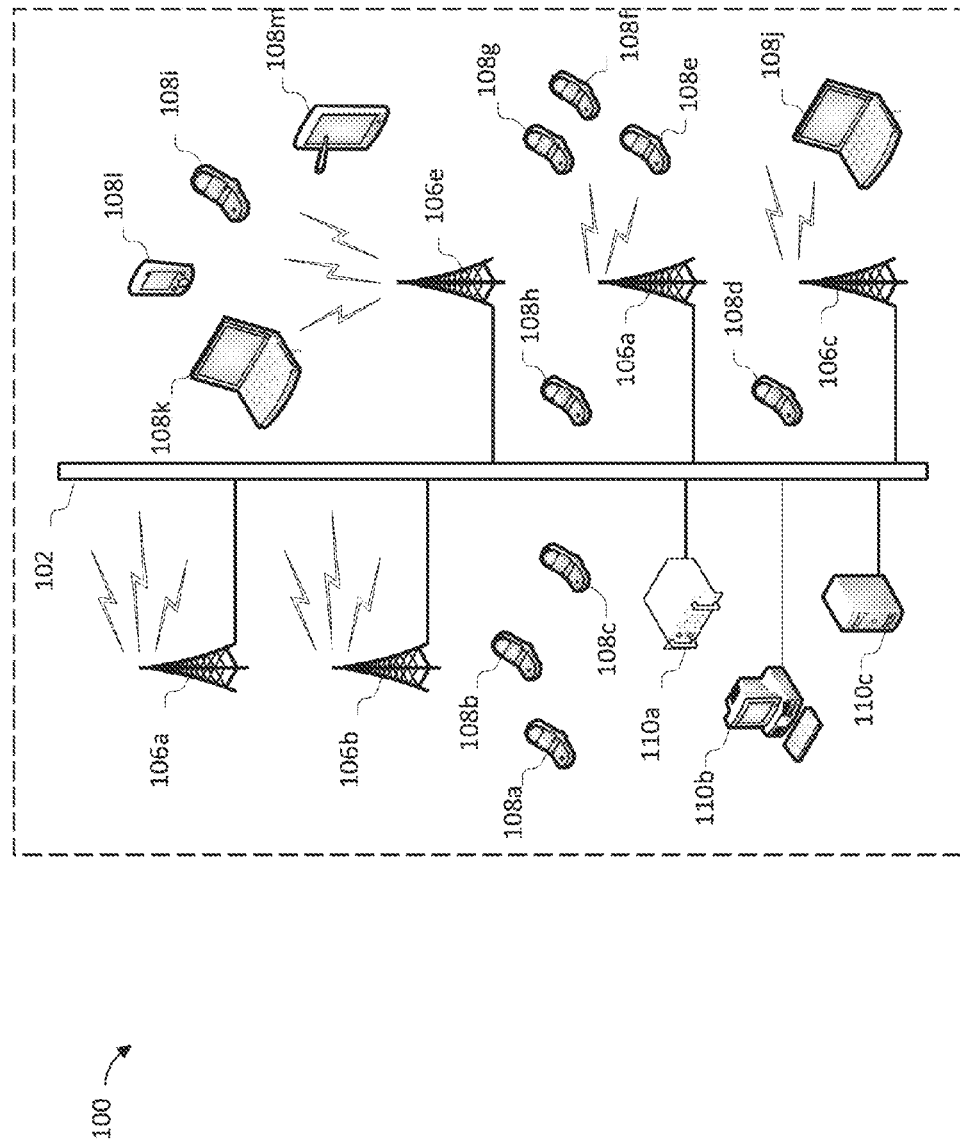
FIG. 1 is a block diagram illustrating a suitable network environment.

Systems and methods for dynamically modifying neighbor lists for cells (e.g., base stations) within telecommunications networks and/or modifying neighbor lists of cells based on determined radio frequency coupling (e.g., geographical coupling) between cells are described. The systems and methods described herein enhance traditional automated neighbor relation (ANR) processes based on the application of dynamic and/or situation specific optimization heuristics, as well as based on the application of quantified geographic and/or radio frequency relationships between network cells, among other benefits.

In the following detailed description, reference is made to the accompanying drawings, which form a part of the description. The embodiments described in the detailed description, drawings, and claims are not meant to be limiting. Other embodiments may be utilized, and other changes may be made, without departing from the spirit or scope of the subject matter presented herein. It will be understood that aspects of the present disclosure, as generally described herein and illustrated in the drawings, may be arranged, substituted, combined, separated, and designed in a wide variety of different configurations.

The technology can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term processor refers to one or more devices, circuits, and/or processing cores configured to process data, such as computer program instructions.

A detailed description of embodiments is provided below along with accompanying figures that illustrate the principles of the technology. The technology is described in connection with such embodiments, but the technology should not be limited to any embodiment. The scope of the technology is limited only by the claims and the technology encompasses numerous alternatives, modifications and equivalents. Numerous specific details are set forth in the following description in order to provide a thorough understanding of the technology. These details are provided for the purpose of illustration and the technology may be practiced according to the claims without some or all of these specific details. For the purpose of clarity, technical material that is known in the technical fields related to the technology has not been described in detail so that the technology is not unnecessarily obscured.

Examples of the Network Environment

FIG. 1 illustrates an example network environment 100, which may include a dynamic ANR system that performs or runs dynamic and/or optimized ANR processing within the network environment 100. Any of the machines, databases, or devices shown in FIG. 1 and other Figures described herein may be implemented in a general-purpose computer modified (e.g., configured or programmed) by software to be a special-purpose computer to perform the functions described herein for that machine, database, or device. Moreover, any two or more of the machines, databases, or devices illustrated in FIG. 1 may be combined into a single machine, and the functions described herein for any single machine, database, or device may be subdivided among multiple machines, databases, or devices.

As depicted, the network environment 100 includes a data communications network 102, one or more base stations or cells 106a-e, one or more network resource controllers 110a-c, and one or more User Equipment (UE) 108a-m, such as mobile devices, wireless devices, or other computing devices. As used herein, the term "base station" refers to a wireless communications station or cell provided in a location that serves as a hub of a wireless network. The base stations may be used with macrocells, microcells, picocells, and femtocells.

The data communications network 102 may include a backhaul portion that can facilitate distributed network communications between any of the network controller devices 110a-c and any of the base stations 106a-e. Any of the network controller devices 110a-c may be a dedicated Network Resource Controller (NRC) that is provided remotely from the base stations or provided at the base station, and may include a rollback system and/or components of a rollback system. Any of the network controller devices 110a-c may be a non-dedicated device that provides NRC functionality, among others. The one or more UE 108a-m may include cell phone devices 108a-i, laptop computers 108j-k, handheld gaming units 108l, electronic book devices or tablet PCs 108m, and any other type of common portable wireless computing device that may be provided with wireless communications service by any of the base stations.

The backhaul portion of a data communications network 102 may include intermediate links between a backbone of the network, which are generally wire line, and sub networks or base stations 106a-e located at the periphery of the network. For example, cellular user equipment (e.g., any of UE 108a-m) communicating with one or more base stations 106a-e may constitute a local sub network. The network connection between any of the base stations 106a-e and the rest of the world may initiate with a link to the backhaul portion of an access provider's communications network 102 (e.g., via a point of presence).

In some embodiments, the NRC has presence and functionality that may be defined by the processes it is capable of carrying out. Accordingly, the conceptual entity that is the NRC may be generally defined by its role in performing processes associated with embodiments of the present disclosure. Therefore, the NRC entity may be considered to be either a hardware component and/or a software component that is stored in computer readable media such as volatile or non-volatile memories of one or more communicating device(s) within the networked computing system 100.

In some embodiments, any of the network controller devices 110a-c and/or base stations 106a-e may function independently or collaboratively to implement processes associated with various embodiments of the present disclosure described herein. Further, processes for dynamically optimizing network elements of a network, such as newly added network element, may be carried out via various communication protocols, such as those associated with modern Global Systems for Mobile (GSM), Universal Mobile Telecommunications System (UMTS), Long Term Evolution (LTE) network infrastructures, and so on.

In accordance with a standard GSM network, any of the network controller devices 110a-c (NRC devices or other devices optionally having NRC functionality) may be associated with a base station controller (BSC), a mobile switching center (MSC), or any other common service provider control device known in the art, such as a radio resource manager (RRM). In accordance with a standard UMTS network, any of the network controller devices 110a-c (optionally having NRC functionality) may be associated with a NRC, a serving GPRS support node (SGSN), or any other common network controller device known in the art, such as an RRM. In accordance with a standard LTE network, any of the network controller devices 110a-c (optionally having NRC functionality) may be associated with an eNodeB base station, a mobility management entity (MME), or any other common network controller device known in the art, such as an RRM.

In some embodiments, any of the network controller devices 110a-c, the base stations 106a-e, as well as any of the UE 108a-m may be configured to run various operating systems, such as Microsoft® Windows®, Mac OS®, Google® Chrome®, Linux®, Unix®, or any mobile operating system, including Symbian®, Palm®, Windows Mobile®, Google® Android®, Mobile Linux®, and so on. Any of the network controller devices 110a-c, or any of the base stations 106a-e may employ any number of common server, desktop, laptop, and personal computing devices.

In some embodiments, any of the UE 108a-m may be associated with any combination of common mobile computing devices (e.g., laptop computers, tablet computers, cellular phones, handheld gaming units, electronic book devices, personal music players, MiFi™ devices, video recorders, and so on), having wireless communications capabilities employing any common wireless data communications technology, including, but not limited to: GSM, UMTS, 3GPP LTE, LTE Advanced, WiMAX, and so on.

In some embodiments, the backhaul portion of the data communications network 102 of FIG. 1 may employ any of the following common communications technologies: optical fiber, coaxial cable, twisted pair cable, Ethernet cable, and power-line cable, along with any other wireless communication technology known in the art. In context with various embodiments described herein, it should be understood that wireless communications coverage associated with various data communication technologies (e.g., base stations 106a-e) typically vary between different service provider networks based on the type of network and the system infrastructure deployed within a particular region of a network (e.g., differences between GSM, UMTS, LTE, LTE Advanced, and WiMAX based networks and the technologies deployed in each network type).

Figure 2:
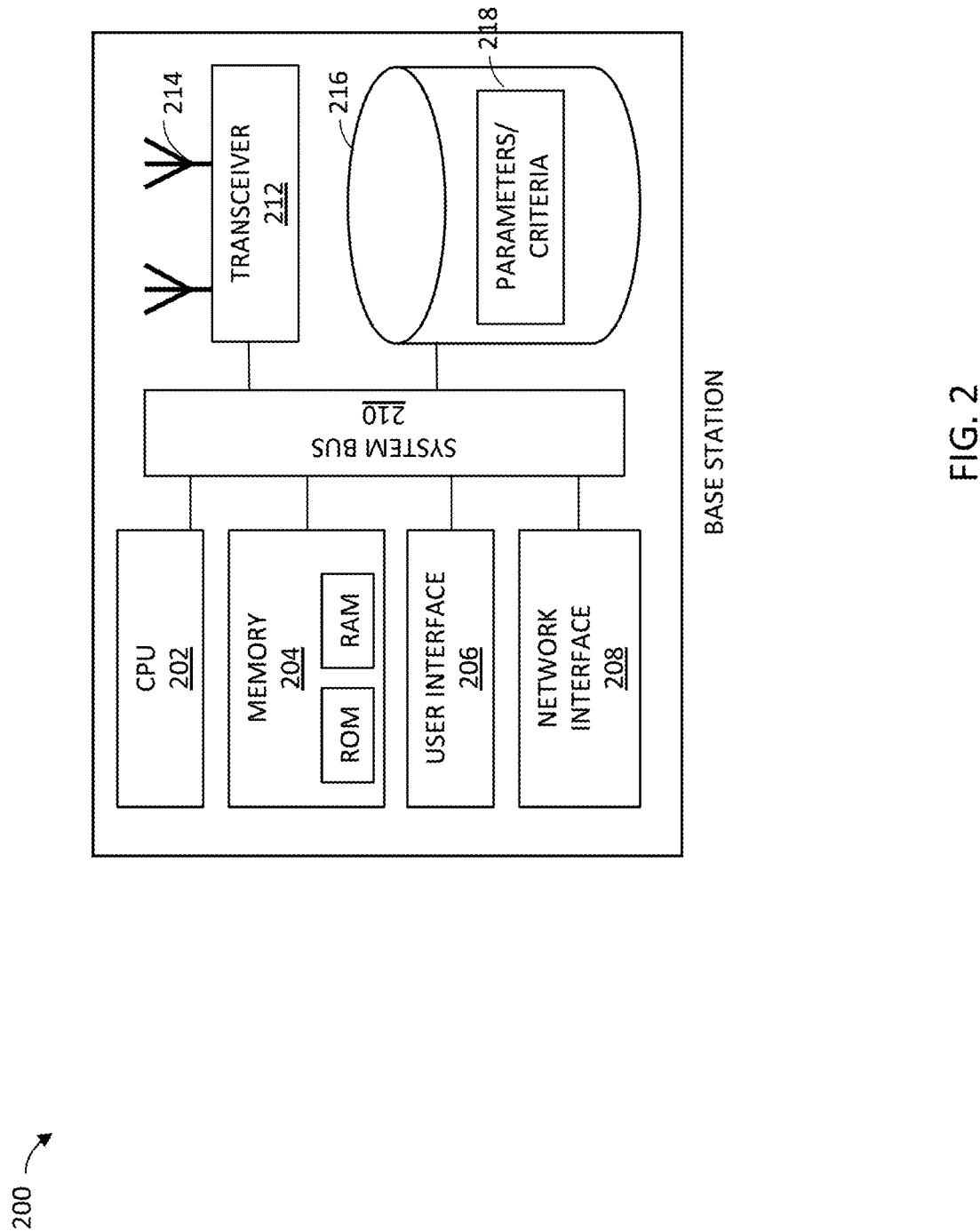
FIG. 2 is a block diagram illustrating a network resource controller.

FIG. 2 illustrates a block diagram of a base station or cell 200 (e.g., a cell, femtocell, picocell, microcell or macrocell) that may be representative of the base stations 106a-e in FIG. 1. In some embodiments, the base station 200 includes at least one central processing unit (CPU) 202. The CPU 202 may include an arithmetic logic unit (ALU, not shown) that performs arithmetic and logical operations and one or more control units (CUs, not shown) that extract instructions and stored content from memory and then executes and/or processes them, calling on the ALU when necessary during program execution. The CPU 202 is responsible for executing computer programs stored on volatile (RAM) and non-volatile (ROM) system memories 204.

The base station 200 may include a user interface 206 for inputting and retrieving data to and from the base station by operator personnel, and a network interface 208 coupled to a wireline portion of the network. Meanwhile, the base station 200 wirelessly sends and receives information to and from UE through a transceiver 212, which is equipped with one or more antennae 214.

The base station 200 may further include a system bus 210 and data storage 216. The system bus facilitates communication between the various components of the base station 200. For example, the system bus 210 may facilitate communication between a program stored in data storage 216 and the CPU 202, which executes the program. In some embodiments, data storage 216 may store information or parameters 218 for the base station 200, such as parameters identifying the geographical or network location of the base station 200, parameters identifying one or more carrier frequencies or operating bands via which the base station 200 operates, parameters identifying hierarchical relationships within the network between the base station 200 and other base stations (e.g., between the base station and neighboring cells), parameters associated with load-balancing or other performance metrics, parameters associated with a position, tilt, and/or geometry of an antenna, information identifying a currently or previously assigned scrambling code, one or more neighbor lists (e.g., Neighbor Relation Tables) and so on. In addition, data storage 216 may include an operating system, and various programs related to the operation of the base station 200.

As an example, in Radio Access Network Operational Support Systems (RAN OSSs), configuration data is typically stored in Managed Objects (MOs). Each MO can be retrieved when its Distinguished Name (DN) is known. MOs are often associated with physical or logical entities within the network. For example, a UtranCell MO may be associated with a logical UMTS cell, such as a UMTS base station. Each MO may have or be associated with multiple configurable parameters (e.g., a UtranCell MO may have associated parameters such as transmit power, handover offsets, or other described herein).

At various times, changes are made to the MOs and/or parameters associated with the MOs. For example, some changes that may be applied to MOs and/or MO parameters include "update" type changes, where or more configurable parameters in the MO are changed, "add" type changes, where a new MO is added to the network, "delete" type changes, where an MO is deleted from the network, and so on.

In various embodiments, the base station 200 may use any modulation/encoding scheme known in the art such as Binary Phase Shift Keying (BPSK, having 1 bit/symbol), Quadrature Phase Shift Keying (QPSK, having 2 bits/symbol), and Quadrature Amplitude Modulation (e.g., 16-QAM, 64-QAM, etc., having 4 bits/symbol, 6 bits/symbol, and so on) to send and receive information to and from UE through the transceiver 212. Additionally, the base station 200 may be configured to communicate with UEs 108a-m via any Cellular Data Communications Protocol, including any common GSM, UMTS, WiMAX or LTE protocol.

Figure 3:
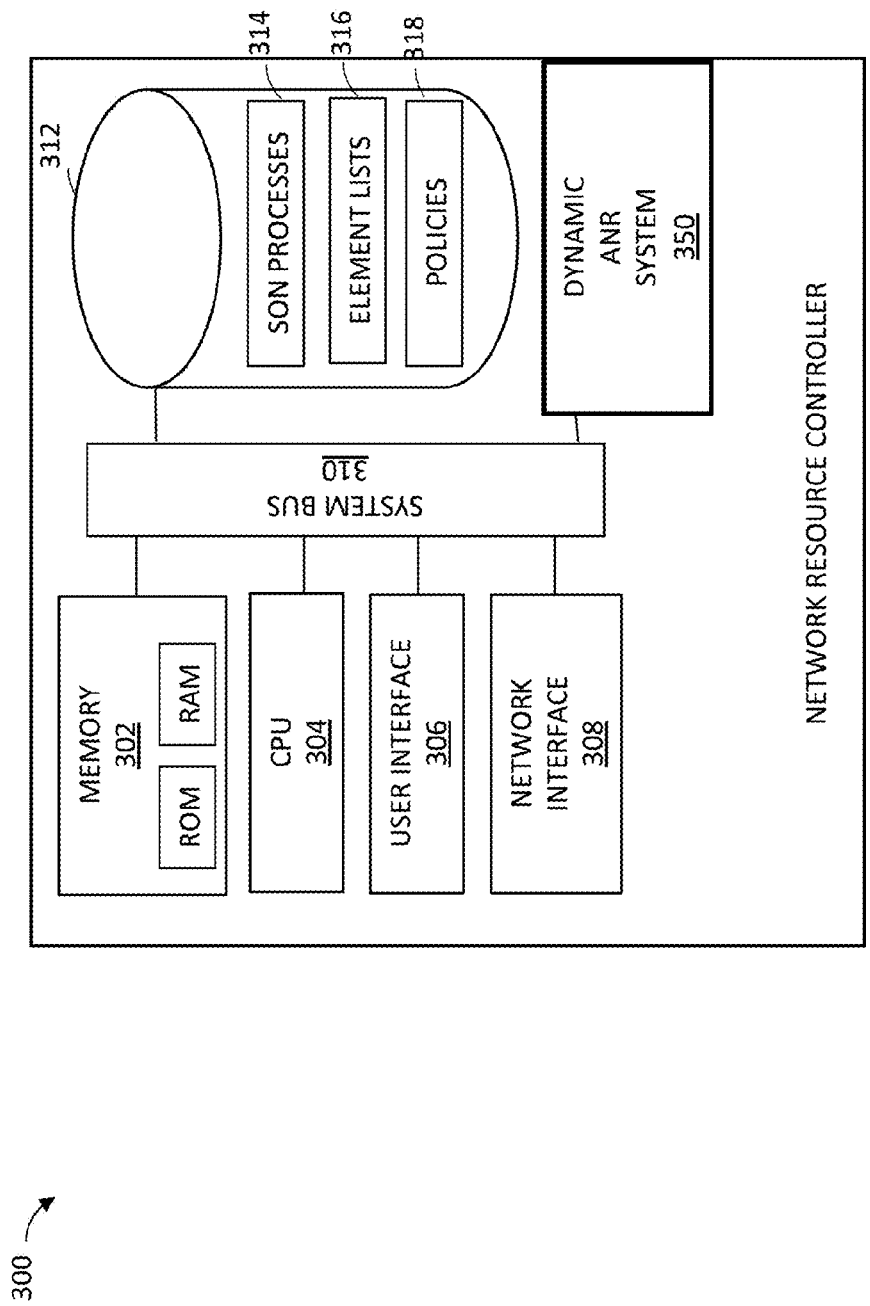
FIG. 3 is a block diagram illustrating a base station or cell.

FIG. 3 illustrates a block diagram of an NRC 300 that may be representative of any of the network controller devices 110a-c. In some embodiments, one or more of the network controller devices 110a-c are self-optimizing or self-organizing network (SON) controllers, such as controllers that perform ANR processing amongst current or newly added cells 200. The NRC 300 includes one or more processor devices, including a central processing unit (CPU) 304. The CPU 304 may include an arithmetic logic unit (ALU) (not shown) that performs arithmetic and logical operations and one or more control units (CUs) (not shown) that extracts instructions and stored content from memory and then executes and/or processes them, calling on the ALU when necessary during program execution.

The NRC 300 may also include a user interface 306 that allows an administrator to interact with the NRC's software and hardware resources and to display the performance and operation of the networked computing system 100. In addition, the NRC 300 may include a network interface 308 for communicating with other components in the networked computer system, and a system bus 310 that facilitates data communications between the hardware resources of the NRC 300.

In addition to the network controller devices 110a-c, the NRC 300 may be used to implement other types of computer devices, such as an antenna controller, an RF planning engine, a core network element, a database system, and so on. Based on the functionality provided by an NRC, the storage device of such a computer serves as a repository for software and database thereto.

The CPU 304 is responsible for executing computer programs stored on volatile (RAM) and nonvolatile (ROM) memories 302 and a storage device 312 (e.g., HDD or SSD). In some embodiments, the storage device 312 may store program instructions as logic hardware such as an ASIC or FPGA. The storage device 312 may include neighbor list information (e.g., Neighbor Relation Tables) 314, measurement report information 316 (e.g., information associated with measured signal strengths or signal qualities for cells), detected set report information and other policy information 318, and other information associated with the components and/or configuration of components within the network environment 100.

In some embodiments, the NRC includes a dynamic ANR system 350, such as a system 350 configured and/or programmed to dynamically modify neighbor lists for cells (e.g., base stations) within telecommunications networks using missing neighbor rule sets, blacklist rule sets, and/or radio frequency coupling rule sets, and so on. Further details regarding the components of the dynamic ANR system 350 and processes performed by the dynamic ANR system 350 will now be described.

Examples of Dynamically Modifying Neighbor Lists for Cells in a Network

Figure 4:
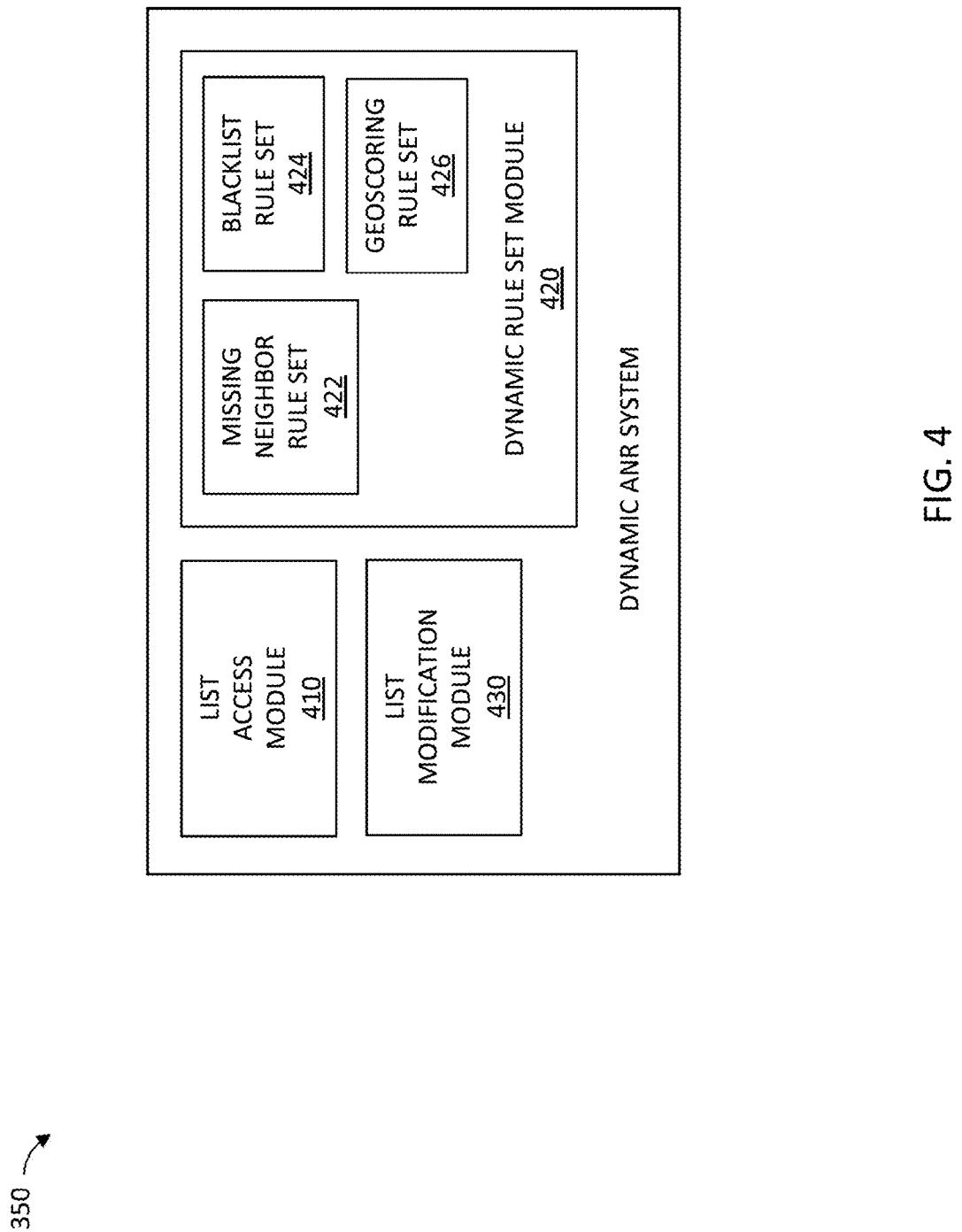
FIG. 4 is a block diagram illustrating the components of a dynamic automated neighbor relation (ANR) system.

As described herein, in some embodiments, the dynamic ANR system 350 performs various processes for cells 200 within the network environment 100 in order to dynamically modify, change, and/or enhance neighbor lists of cells, which enables the network to provide seamless or optimized handoff of calls between cells, among other things. For example, the dynamic ANR system 350 may identify dynamic and/or situation specific optimization heuristics within the network environment 100, and modify various components or devices of the network environment 100 based on the dynamically and/or situationally identified heuristics. FIG. 4 is a block diagram illustrating the components of the dynamic automated neighbor relation (ANR) system 350, which may include one or more modules and/or components to perform one or more operations of the dynamic ANR system 350. The modules may be hardware, software, or a combination of hardware and software, and may be executed by one or more processors. For example, the dynamic ANR system 350 may include a list access module 410, a dynamic rule set module 420, and a list modification module 430.

In some embodiments, the list access module 410 is configured and/or programmed to access or receive a neighbor list associated with a target cell (e.g., source cell), or associated with one or more neighbor cells of the target cell within a network. For example, the list access module 410 accesses a Neighbor Relations Table that includes a list of neighbor cells identifiers for a given cell within the network.

In some embodiments, the dynamic rule set module 420 is configured and/or programmed to apply one or more dynamic optimization rule sets to the target cell. For example, the dynamic rule set module 420 may apply a missing neighbor rule set 422 to the target cell (e.g., the neighbor list of the target cell), may apply a dynamic blacklisting rule set 424 to neighbor cells listed within a neighbor list of the target cell, and/or may apply a radio frequency coupling (e.g., geoscoring) 426 rule set to neighbor cells listed within the neighbor list of the target cell.

In some embodiments, the list modification module 430 is configured and/or programmed to modify a neighbor list associated with the target cell or with neighbor cells to the target cell based on the applied rule sets. For example, the list modification module 430 may remove one or more neighbor cells from the neighbor list of the target cell, may add the target cell to a neighbor list of a neighbor cell to the target cell, and may provide the modified neighbor list to automated neighbor relation optimization processes 314 running within the network environment 100 to optimize the cells 200 and other components within the network.

Figure 5:
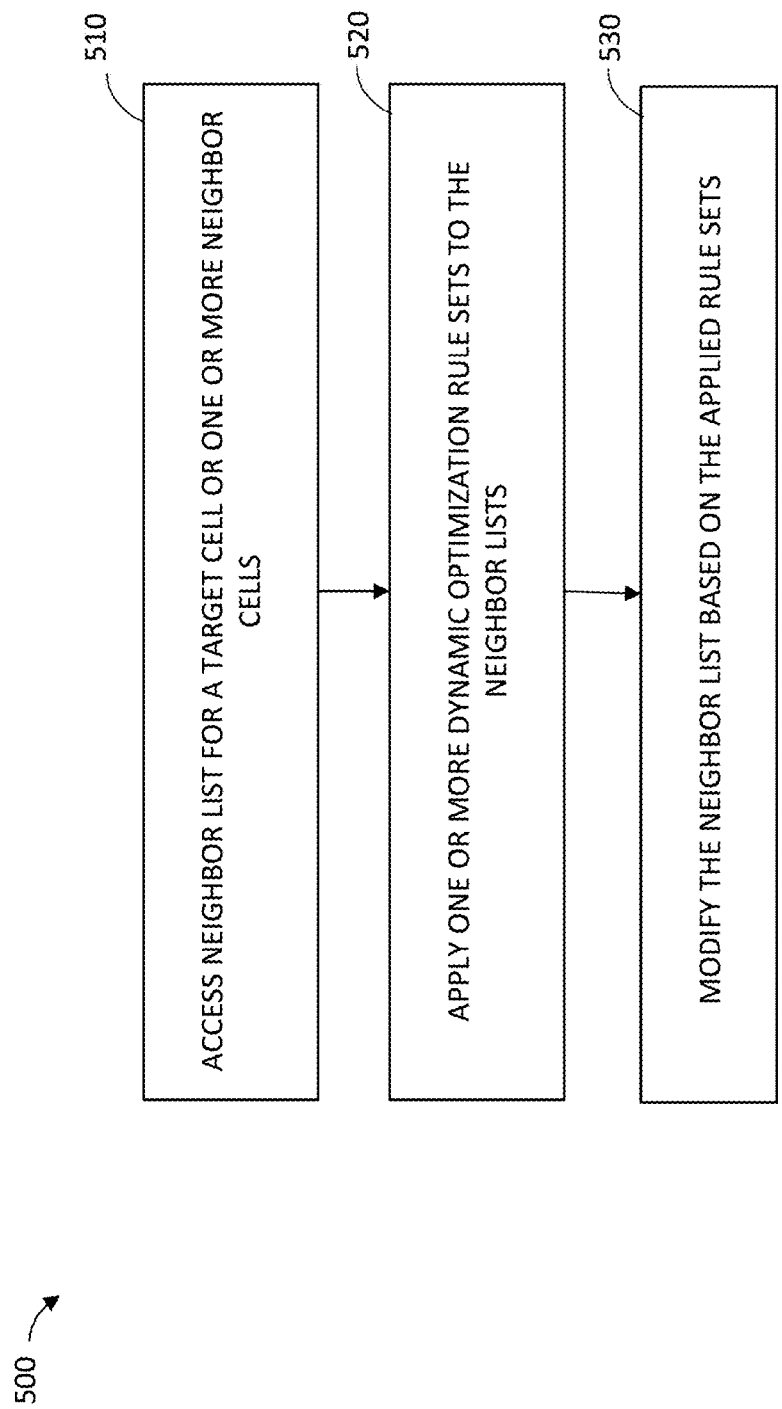
FIG. 5 is a flow diagram illustrating a method for modifying neighbor lists of cells within a telecommunications network.

As described herein, the dynamic ANR system 350 may perform various algorithms, routines, and/or methods when modifying neighbor lists for cells within a network. FIG. 5 is a flow diagram illustrating a method 500 for modifying neighbor lists of cells within a telecommunications network. The method 500 may be performed by the dynamic ANR system 350 (and its modules) and, accordingly, is described herein merely by way of reference thereto. It will be appreciated that the method 500 may be performed on any suitable hardware.

In operation 510, the dynamic ANR system 350 accesses a neighbor list associated with a target cell or associated with one or more neighbor cells of the target cell within a network. For example, the list access module 410 accesses a Neighbor Relations Table that includes a list of neighbor cells identifiers for a given cell within the network.

In operation 520, the dynamic ANR system 350 applies one or more dynamic optimization rule sets to the target cell. For example, the dynamic rule set module 420 may apply a missing neighbor rule set 422 to the target cell (e.g., the neighbor list of the target cell), may apply a dynamic blacklisting rule set 424 to neighbor cells listed within a neighbor list of the target cell, and/or may apply a radio frequency coupling (e.g., geoscoring) 426 rule set to neighbor cells listed within the neighbor list of the target cell.

In operation 530, the dynamic ANR system 350 modifies a neighbor list associated with the target cell or with neighbor cells to the target cell based on the applied rule sets. For example, the list modification module 430 may remove one or more neighbor cells from the neighbor list of the target cell, may add the target cell to a neighbor list of a neighbor cell to the target cell, and may provide the modified neighbor list to automated neighbor relation optimization processes 314 running within the network environment 100 to optimize the cells 200 and other components within the network.

Therefore, the dynamic ANR system 350 may perform various different operations, separately or together, within running automated neighbor relation optimization processes, in order to optimize the ANR processes and provide a network with current, situation specific, and/or dynamically updated neighbor lists for its components. For example, the dynamic ANR system 350 may access a neighbor list associated with the cell or associated with one or more neighbor cells of the cell within the network, apply one or more dynamic optimization rule sets to the neighbor list associated with the cells or associated with the one or more neighbor cells, and modify the neighbor lists based on the applied rule sets.

As described herein, the dynamic ANR system 350 may apply a missing neighbor rule set to the one or more cells within the network, apply a dynamic blacklisting rule set to the one or more cells within the network, and/or apply a geoscoring rule set to the one or more cells within the network. Further details regarding the rule sets and the application of the rule sets to ANR processes running within a network will now be described.

Modifying Neighbor Lists Based on Missing Neighbor Rule Sets

As described herein, the dynamic ANR system 350 may apply a missing neighbor rule set to target or source cells, and modify the cells' neighbor lists, (such as by adding additional neighbor cells to the neighbor lists), which assists in avoiding excessive dropped calls at the target or source cells due to a lack of neighbor cells at which to hand off calls within the network 100.

Figure 6:
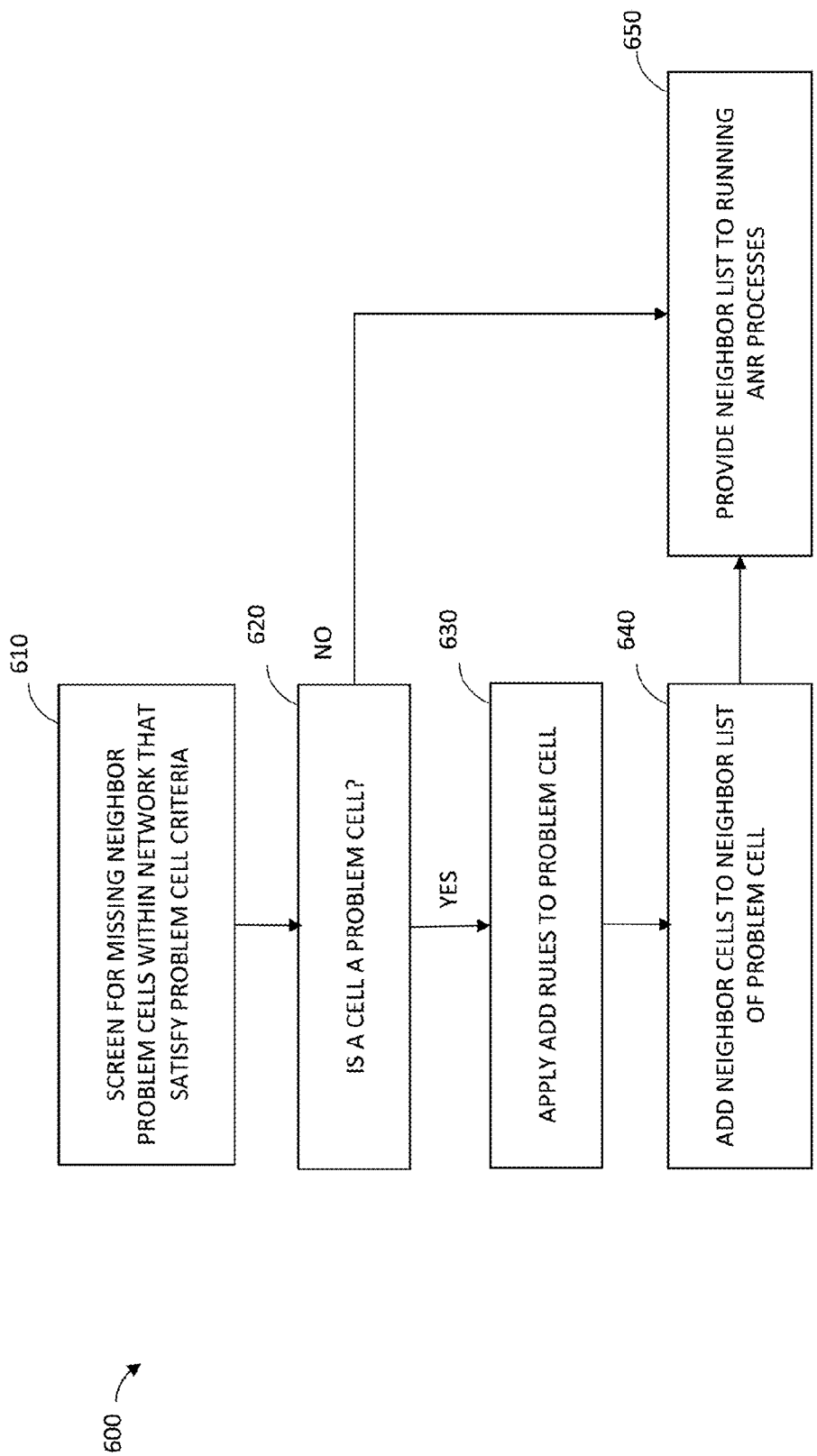
FIG. 6 is a flow diagram illustrating a method for modifying a neighbor list based on an application of a missing neighbor rules set to an ANR process.

FIG. 6 is a flow diagram illustrating a method 600 for modifying a neighbor list based on an application of a missing neighbor rules set 422 to an ANR process. The method 600 may be performed by the dynamic ANR system 350 (and its modules) and, accordingly, is described herein merely by way of reference thereto. It will be appreciated that the method 600 may be performed on any suitable hardware.

In operation 610, the dynamic ANR system 350 screens the cells 200 within the network 100 for cells that may be considered missing neighbor problem cells, such as cells whose performance indicates the cell has an insufficient number of neighbor cells within their neighbor list. For example, the dynamic ANR system 350 may access, receive, or track performance characteristics associated with the cells 200 within the network 100, such as call completion handoff statistics or rates, call drop statistics or rates, and so on. The dynamic ANR system 350 may track the performance for a certain time period (e.g., the last 30 days), in response to an event (e.g., an addition or removal of cells from a network, in response to a certain number of complaint calls), and/or may be an automated process.

In operation 620, the dynamic ANR system 350 determines that a cell within a telecommunications network is a missing neighbor problem cell that satisfies one or more problem cell criteria. For example, the dynamic ANR system 350 may determine that the cell has dropped a threshold number of calls (e.g., less than 95 percent of all calls) handed off between neighbor cells and the cell. As another example, the dynamic ANR system 350 may access information identifying the number of calls that have been dropped due to a missing neighbor, where cells reporting drops due to a missing neighbor are missing neighbor problem cells.

In addition, the dynamic ANR system 350 may determine a cell is a missing neighbor problem cell when, in GSM systems, the cell is associated with multiple or excessive measurements from neighbors that are not already on its neighbor list, the measurements containing signal measurements from surrounding cells along with information identifying the cell from which the signals were sent (e.g., the BCCH Frequency and Base Station Identity Code (BSIC) of the neighbor cell).

Furthermore, the dynamic ANR system 350 may determine a cell is a missing neighbor problem cell when, in UMTS systems, the cell is associated with multiple or excessive detected set reports, where the reports contain neighbor cell identifying information along with signal strength and interference measurements.

Thus, the dynamic ANR system 350 identifies patterns of call handoff performance for a given cell, and determines the cell is a missing neighbor problem cell when the patterns indicate an unsatisfactory performance of calls handed off from the cell to neighbor cells.

When the cell is a missing neighbor problem cell, the dynamic ANR system 350, in operation 630, applies one or more add rules to the determined problem cell. For example, the dynamic ANR system 350 may apply add rules to identify neighbor cells having characteristics that satisfy an inter-site distance multiplier criterion (e.g., an inter-site distance multiplier of 1.75× or greater), a received energy per noise power density, or EcNo, threshold relaxation criterion (e.g., an EcNo relaxation threshold of 1 or greater), a received signal code power (RSCP) threshold relaxation criterion (e.g., an RSCP relaxation threshold of 3 or greater), and/or other cell or call handling quality indicators or criteria.

As another example, the dynamic ANR system 350 may apply add rules that are based on a power class assigned to the determined problem cell, and identify neighbor cells having current characteristics that satisfy a distance limit criterion and a signal quality criterion based on the identified power class assigned to the determined problem cell and/or may apply add rules based on a current parameter configuration of the determined problem cell, and identify neighbor cells having current characteristics that satisfy a distance limit criterion and a signal quality criterion based on the identified current parameter configuration of the determined problem cell.

In operation 640, the dynamic ANR system 350 adds one or more neighbor cells to a neighbor list of the determined problem cell based on the applied one or more add rules. For example, the dynamic ANR system 350 may access neighbor list information stored in local storage 216 of the cell 200 and/or stored in local storage 312 of the network resource controller 300, and modify the neighbor list information associated with the cell by adding additional neighbor cells that have characteristics satisfying the add rules applied in operation 630. In operation 650, the dynamic ANR system 350 provides the neighbor list to an automated neighbor relation process running within the telecommunications network.

Thus, the dynamic ANR system 350 may enhance existing, static ANR processes running within a network by monitoring the performance of cells within the network, identifying certain cells as problem cells, and modifying the neighbor lists associated with the problem cells with additional neighbor cells that satisfy certain neighbor cell add rules. For example, the dynamic ANR system 350 determines that a cell of the telecommunications network 100 has dropped more than a threshold number of calls handed off from the cell, identifies one or more neighbor cells having characteristics that satisfy cell addition criteria, and adds the identified one or more neighbor cells to a neighbor list of the cell.

Modifying Neighbor Lists Based on Dynamic Blacklisting Rule Sets

As described herein, the dynamic ANR system 350 may dynamically remove cells from neighbor lists of cells (e.g., adding the cells to a blacklist), based on an analysis of the historical performance of the cells within the network, by predicting with a high probability that adding the cells to other neighbor lists will lead to degraded network performance.

Figure 7:
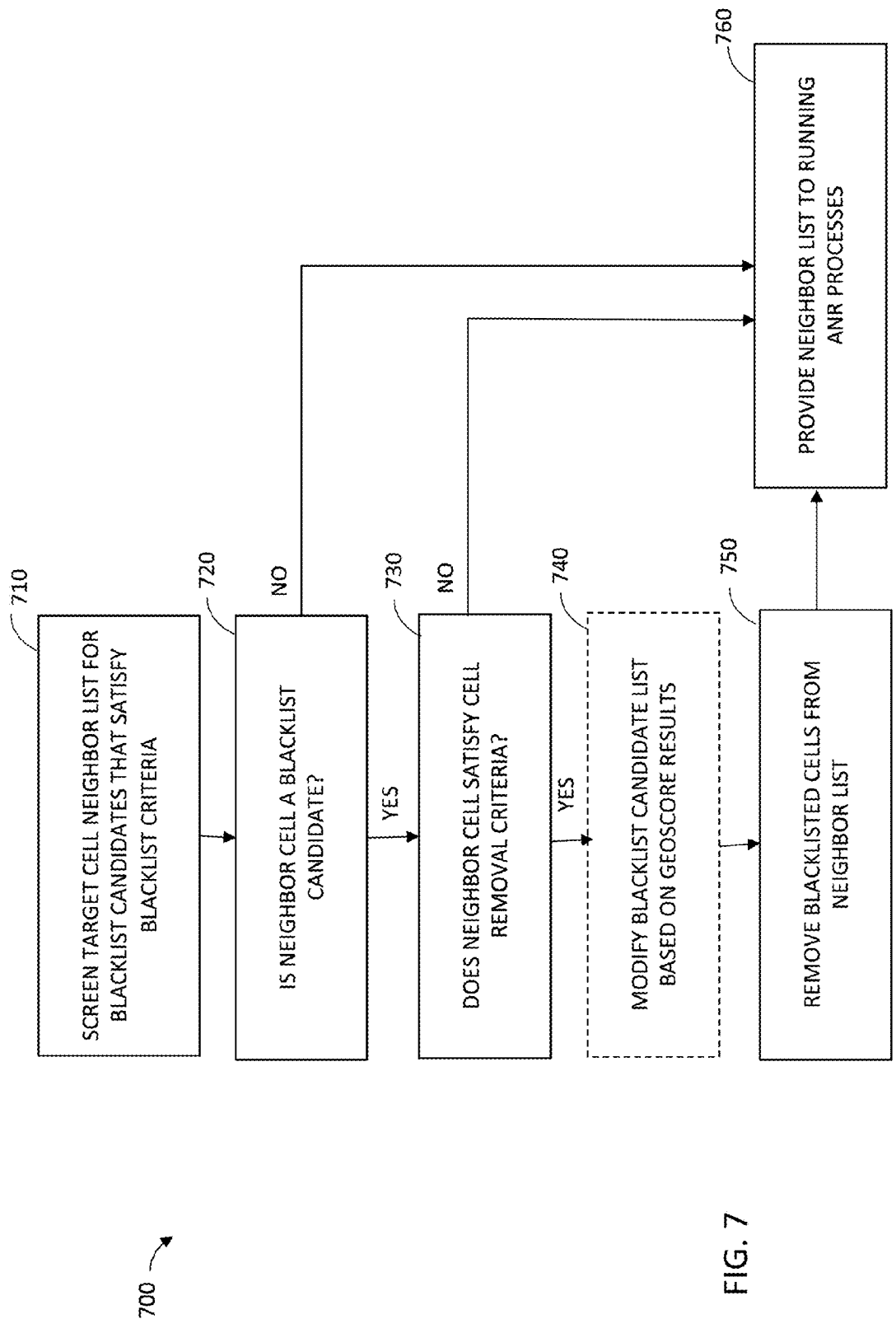
FIG. 7 is a flow diagram illustrating a method for modifying a neighbor list based on an application of a blacklist rules set to an ANR process.

FIG. 7 is a flow diagram illustrating a method 700 for modifying a neighbor list based on an application of a blacklist rules set 424 to an ANR process. The method 700 may be performed by the dynamic ANR system 350 (and its modules) and, accordingly, is described herein merely by way of reference thereto. It will be appreciated that the method 700 may be performed on any suitable hardware.

In operation 710, the dynamic ANR system 350 screens the cells 200 within the network 100 for cells that may be considered blacklist candidates, such as cells whose performance indicates a future cell handoff performance predicted to be unsatisfactory. For example, the dynamic ANR system 350 may access, receive, or track performance characteristics associated with the cells 200 within the network 100, such as call completion handoff statistics or rates, call drop statistics or rates, and so on. The dynamic ANR system 350 may track the performance for a certain time period (e.g., the last 30 days), in response to an event (e.g., an addition or removal of cells from a network, in response to a certain number of complaint calls), and/or may be an automated process.

In operation 720, the dynamic ANR system 350 identifies one or more neighbor cells on a neighbor list of a target cell as blacklist candidates. For example, the dynamic ANR system 350 identifies all cells having a handover success rate that is less than a threshold handover rate (e.g., less than ninety five percent) as blacklist candidates.

In operation 730, the dynamic ANR system 350 determines which of the blacklist candidates have characteristics that satisfy cell removal criteria. For example, the dynamic ANR system 350 determines a blacklist candidate cell is to be removed when the cell is at a location from the target cell that is outside of a threshold distance range (e.g., 10 kilometers) and/or is located at a distance that is greater than a distance multiplier of a first order median neighbor distance value (e.g., greater than 1.25x), among other criteria.

In some embodiments, the dynamic ANR system 350 may apply second order neighbor cell removal criteria when determining whether a blacklist candidate cell is to be removed from one or more cell neighbor lists. For example, the dynamic ANR system 350 may apply distance thresholds associated with suitable distances at which neighbor cells considered to be second order neighbor cells (e.g., neighbor cells to a neighbor cell of a source cell) may be located with respect to a source or target cell.

In operation 740, the dynamic ANR system 350 optionally determines which of the blacklist candidates have a geoscore or other radio frequency coupling score that is outside of a suitable neighbor cell range of geoscores. For example, the dynamic ANR system 350 may modify a selection of blacklist candidates to be removed from a neighbor list, determined in operation 350, based on an application of a geoscore rules set 426 to the grouping. The applied geoscore rules set 426 may modify the blacklist criteria applied to the blacklist candidates based on a determined radio frequency coupling between cells (e.g., when a geoscore is negative, the threshold distance range is reduced from 10 to 9 km, the distance multiplier of a first order median neighbor distance value between cells is increases to a factor of 1.5x, and so on).

In operation 750, the dynamic ANR system 350 removes the blacklist candidates having characteristics that satisfy the cell removal criteria from the neighbor list of the target cell. For example, the dynamic ANR system 350 may access neighbor list information stored in local storage 216 of the cell 200 and/or stored in local storage 312 of the network resource controller 300, and modify the neighbor list information associated with the cell by removing the neighbor cells that have characteristics satisfying the removal rules applied in operation 730 and/or 740. In operation 760, the dynamic ANR system 350 provides the neighbor list to an automated network relation process running within the telecommunications network.

Thus, the dynamic ANR system 350 may enhance existing, static ANR processes running within a network by monitoring the performance of cells within the network, identifying certain cells as historically poor performing handover cells, and modifying the neighbor lists associated with neighbor cells by removing the cells from the lists. For example, the dynamic ANR system 350 may identify or determine a neighbor cell within a neighbor list of a target cell of the telecommunications network that has a handoff success rate, which is less than ninety five percent or another threshold rate associated with unsuitable handoff performance, determine the neighbor cell is associated with characteristics that satisfy cell removal criteria, and remove the neighbor cell from the neighbor list of the target cell.

The dynamic ANR system 350 may utilize the following set of operations when determining whether a cell is to be added to a blacklist:

If existing neighbor cell distance is >then dynamic BL distance, AND >distance multiplier of $1^{st}$ order median neighbor distance, AND has a Geoscore <0, AND a HO success rate is <BL Success Rate Threshold, REMOVE the cell from the neighbor list;

OR

If existing neighbor cell distance is >then minimum second order distance, AND >multiplier of $1^{st}$ order median nbr distance*$2^{nd}$ order multiplier, AND HO success rate is <BL Success Rate Threshold, REMOVE the cell from the neighbor list.

Of course, the dynamic ANR system may utilize other operations described herein.

Modifying Neighbor Lists Based on the Coupling of Cells within a Network

As described herein, the dynamic ANR system 350 may determine the radio frequency coupling or overlap (e.g., geoscore) between cells by applying the geoscoring rule set 426, and perform actions based on the determined radio frequency coupling, such as actions to couple cells to one another, actions to add or remove one cell from another cell's neighbor list, actions to modify criteria or rules within rule sets that are applied to a cell, among other things.

Figure 8:
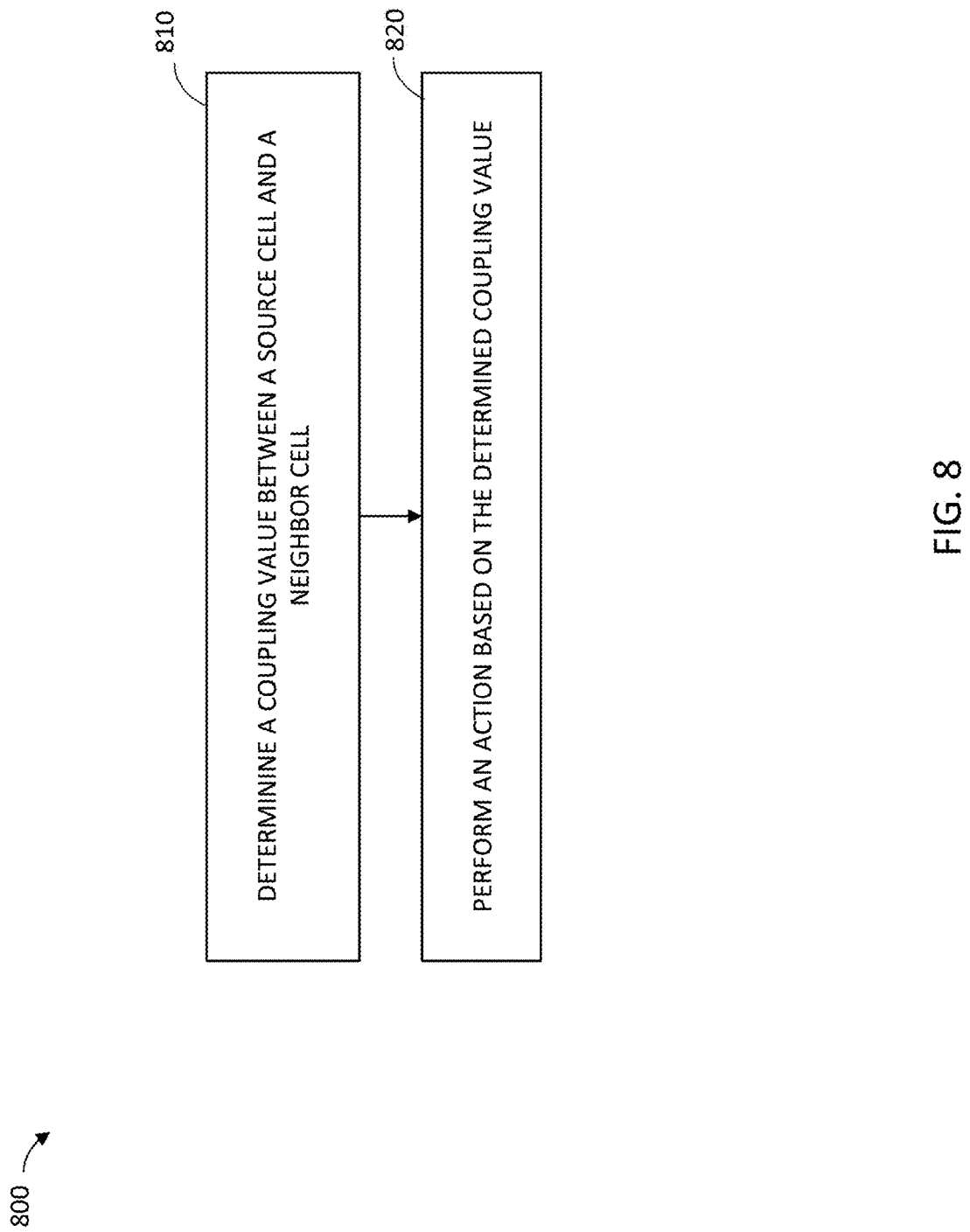
FIG. 8 is a flow diagram illustrating a method for performing an action associated with an ANR process based on a determined coupling value for cells within a telecommunications network.

FIG. 8 is a flow diagram illustrating a method 800 for performing an action associated with an ANR process based on a determined coupling value for cells within a telecommunications network. The method 800 may be performed by the dynamic ANR system 350 (and its modules) and, accordingly, is described herein merely by way of reference thereto. It will be appreciated that the method 800 may be performed on any suitable hardware.

In operation 810, the dynamic ANR system 350 determines a coupling value for a source cell and a neighbor cell within a telecommunications network. The coupling value may be based on an antenna relationship between the source cell and the neighbor cell and/or based on a coverage area relationship between the source cell and the neighbor cell.

For example, the dynamic ANR system 350 may determine a coupling value defined as a geoscore, which quantifies a degree of radio frequency coupling between the source cell and the neighbor cell. For example, a geoscore may be a number between −1 and 1, where a negative score (−1<x<0) indicates a source cell is aiming away from a target (e.g., neighbor cell), and a positive score (0<x<1) indicates the source cell is aiming towards the target cell.

By determining a geoscore between cells, the dynamic ANR system 350 is able to quantify the degree of radio frequency coupling or isolation between two or more cells based on the coverage areas and antenna relationships between the cells. The geoscores enable the dynamic ANR system 350 to rank cells based on the degree of coupling or isolation between specific network cells in a consistent and repeatable manner, and accounts for the physics of radio wave propagation and antenna coverage patterns between the cells.

As described herein, the dynamic ANR system 350 may determine geoscores for cells to provide for an optimal neighbor seeding for new cells in ANR processes within 2G, 3G, and 4G UMTS networks, among other networks, may determine geoscores in order to utilize the scores as a criterion for deleting distant (or erroneous) neighbors in ANR processes, and/or may determine geoscores in order to augment small neighbor lists using various neighbor seeding techniques. Of course, the dynamic ANR system 350, or other systems running ANR processes or other processes within the network environment 100, may utilize information associated with determining radio frequency coupling between cells of the network 100.

The following examples provide different methods for determining a geoscore between a source cell and a neighbor cell, using algorithms that utilize the following information associated with the cells as inputs: the cell locations (latitude and longitude), and the cell azimuths (degrees), defined as the antenna pointing angle relative to a defined geographic grid (e.g., magnetic North). In some embodiments, this information is utilized from all intra-frequencies, inter-frequencies, and IRAT layers of the cells.

Figure 9A:
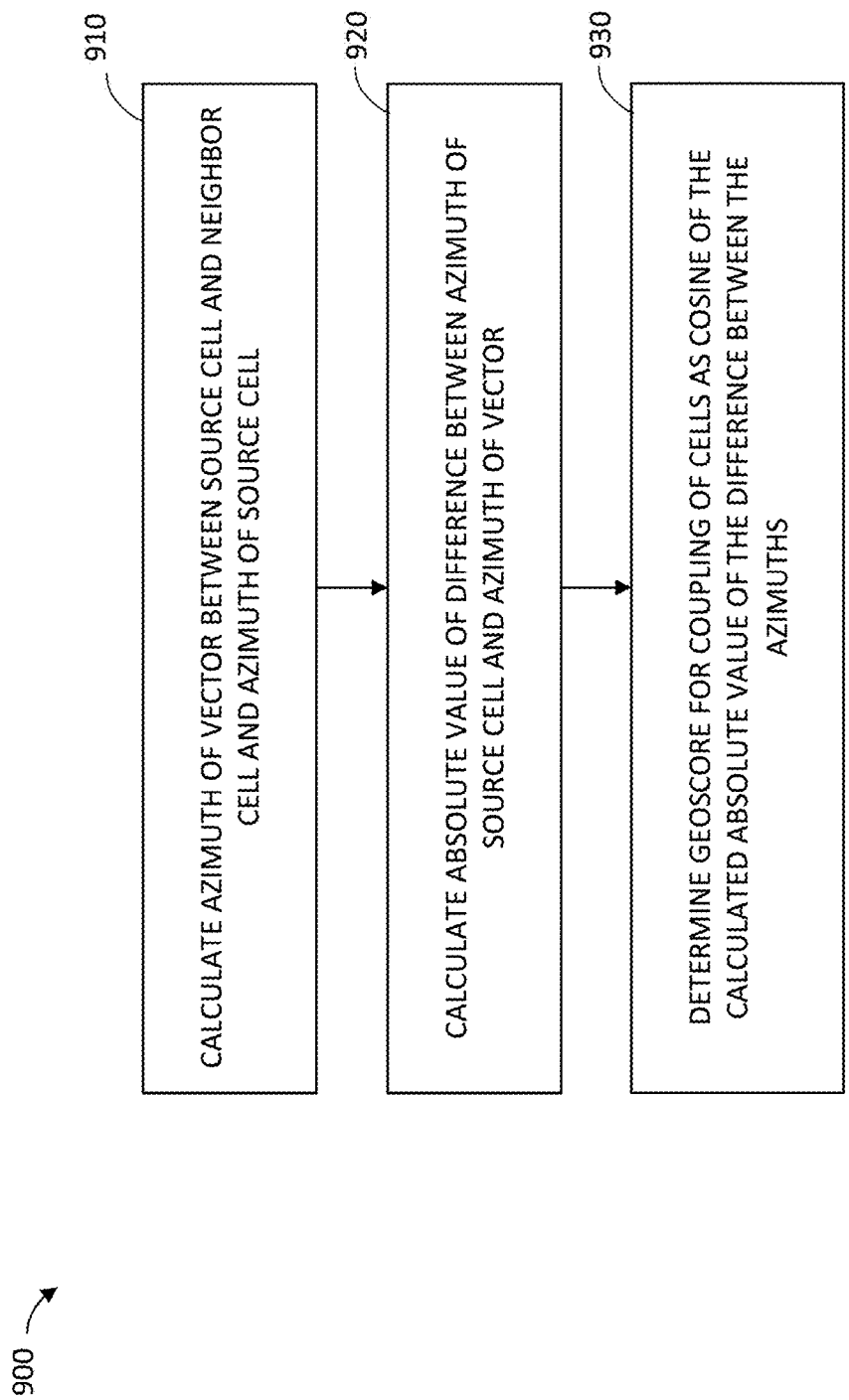
FIG. 9A is a flow diagram illustrating a method for calculating a geoscore for a source cell and a neighbor cell.
Figure 9B:
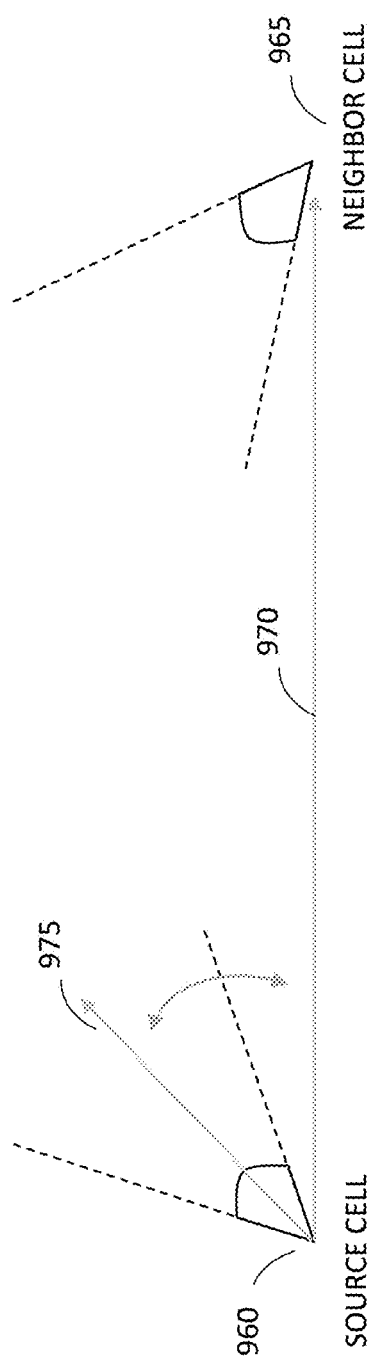
FIG. 9B is a diagram illustrating a radio frequency coupling between a source cell and a neighbor cell.

As a first example, FIG. 9A is a flow diagram illustrating a method 900 for calculating a geoscore for a source cell and a neighbor cell, and FIG. 9B illustrates the radio frequency coupling between the source cell and the neighbor cell. The method 900 may be performed by the dynamic ANR system 350 (and its modules) and, accordingly, is described herein merely by way of reference thereto. It will be appreciated that the method 900 may be performed on any suitable hardware.

In operation 910, the dynamic ANR system 350 calculates an azimuth of a vector 970 between a location of the source cell 960 and a location of the neighbor cell 965 and an azimuth of an antenna of the source cell. For example, in FIG. 9B, the azimuth=0 degrees (out of a possible value of 0-180 degrees).

In operation 920, the dynamic ANR system 350 calculates an absolute value of a difference between the azimuth of the antenna 975 of the source cell 960 and the azimuth of the vector 970. For example, in FIG. 9B, the azimuth of the antenna is 45 degrees and the difference is also 45 degrees.

In operation 930, the dynamic ANR system 350 determines a geoscore for the source cell 960 and the neighbor cell 965, where the geoscore is the cosine of the calculated absolute value of the difference between the azimuth of the antenna 975 of the source cell 960 and the azimuth of the vector 970. For example, in FIG. 9B, the geoscore is calculated as cosine(45−0)=0.707. Thus, the geoscore is positive and indicates that the source cell 960 is aiming towards the target cell 965.

Figure 10A:
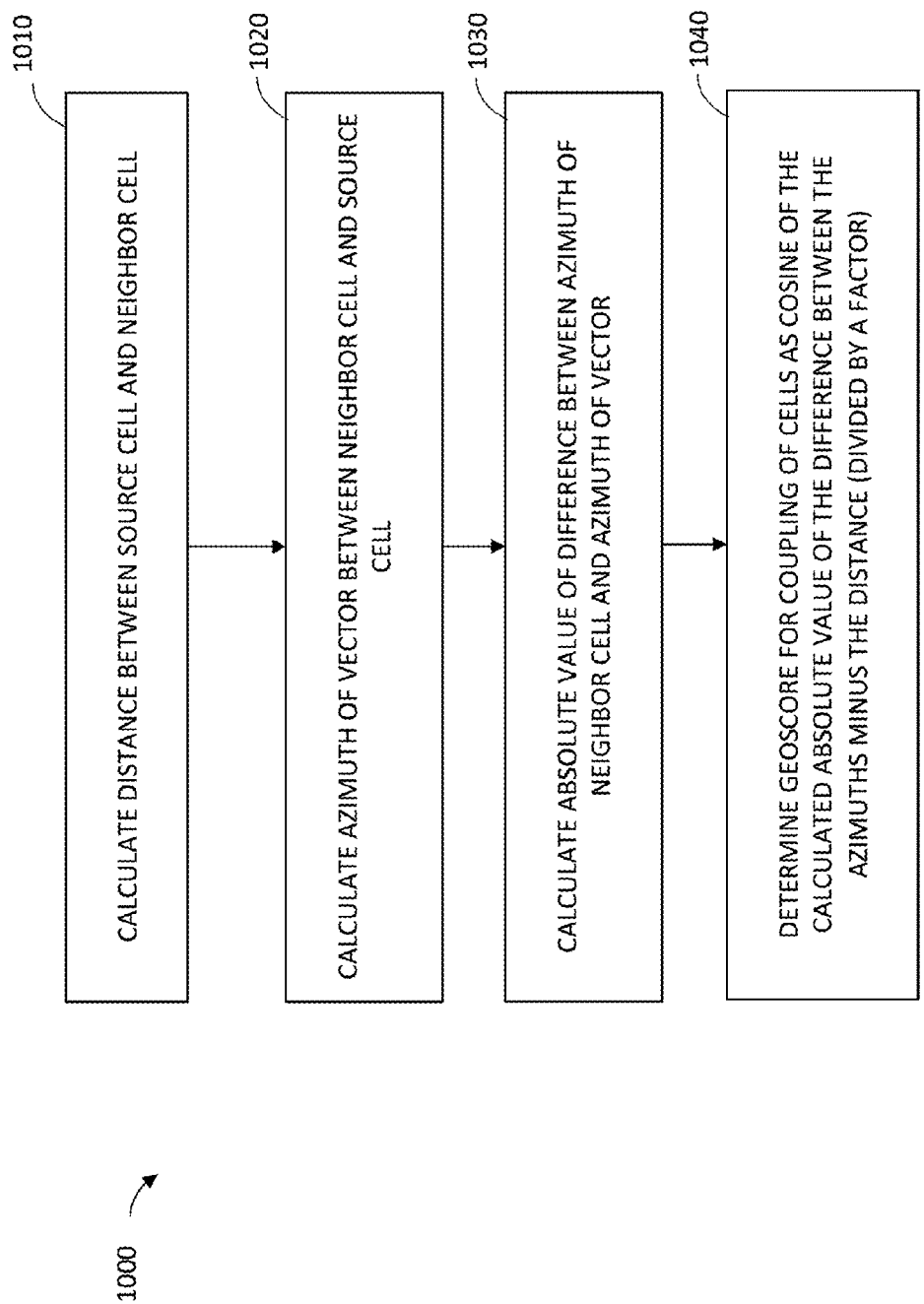
FIG. 10A is a flow diagram illustrating a method for calculating a geoscore for a source cell and newly seeded neighbor cell.
Figure 10B:
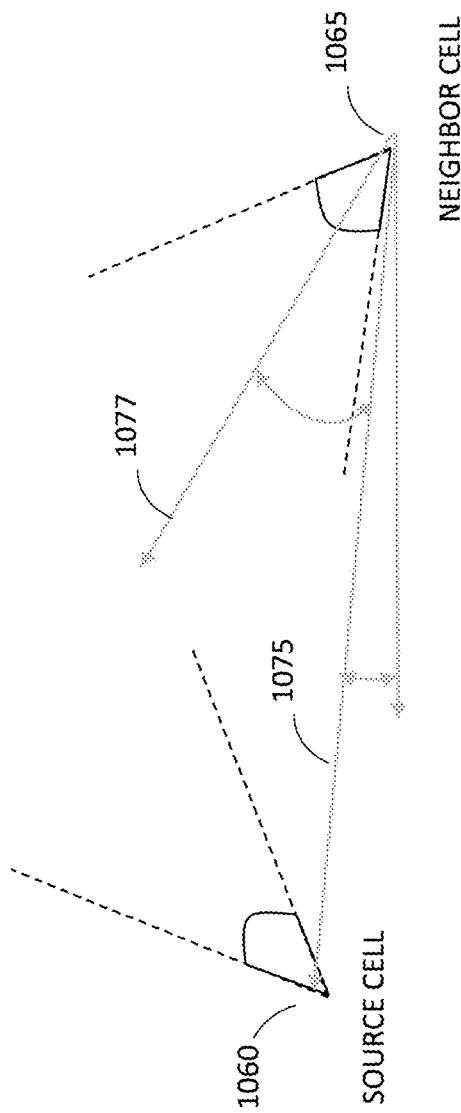
FIG. 10B is a diagram illustrating a radio frequency coupling between a source cell and a newly seeded neighbor cell.

As a second example, FIG. 10A is a flow diagram illustrating a method 1000 for calculating a geoscore for a source cell and newly seeded neighbor cell, and FIG. 10B illustrates a radio frequency coupling between the source cell and the newly seeded neighbor cell. The method 1000 may be performed by the dynamic ANR system 350 (and its modules) and, accordingly, is described herein merely by way of reference thereto. It will be appreciated that the method 1000 may be performed on any suitable hardware.

In operation 1010, the dynamic ANR system 350 calculates a distance between a location of a source cell 1060 and a location of a neighbor cell 1065. For example, in FIG. 10A, the calculated distance is 5 kilometers.

In operation 1020, the dynamic ANR system 350 calculates an azimuth of a vector 1075 between the location of the neighbor cell 1060 and the location of the source cell 1065. For example, in FIG. 10B, this azimuth is 10 degrees.

In operation 1030, the dynamic ANR system 350 calculates an absolute value of a difference between the azimuth of the antenna 1077 of the neighbor cell and the azimuth of the vector 1075. For example, in FIG. 10B, this difference is 30 degrees.

In operation 1040, the dynamic ANR system 350 determines a geoscore for the source cell 1060 and the neighbor cell 1065, the geoscore being a cosine of the calculated absolute value of the difference between the azimuth of the antenna 1077 of the neighbor cell 1065 and the azimuth of the vector 1075, minus the calculated distance between the location of the source cell and the location of the neighbor cell multiplied by a pre-determined weighting factor. For example, in FIG. 10B, the geoscore is calculated as cosine (30)=0.866−0.5 (5 kilometers divided by a tuning factor of 10), or 0.36. Thus, the geoscore indicates that the source cell 1060 is aiming towards the neighbor cell.

Figure 11A:
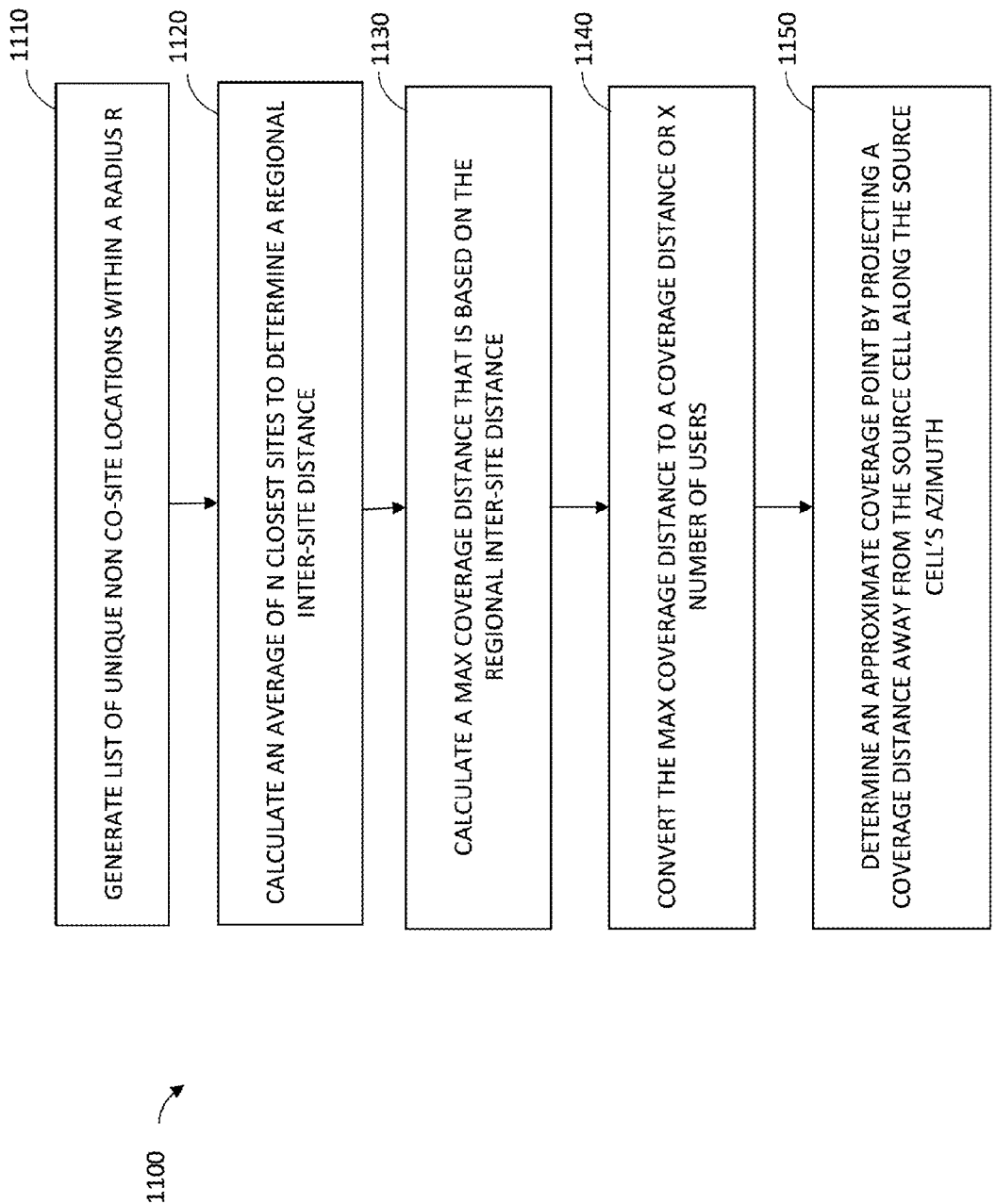
FIG. 11A is a flow diagram illustrating a method for calculating a coverage distance for a projected location of a source cell and newly seeded neighbor cell.
Figure 11B:
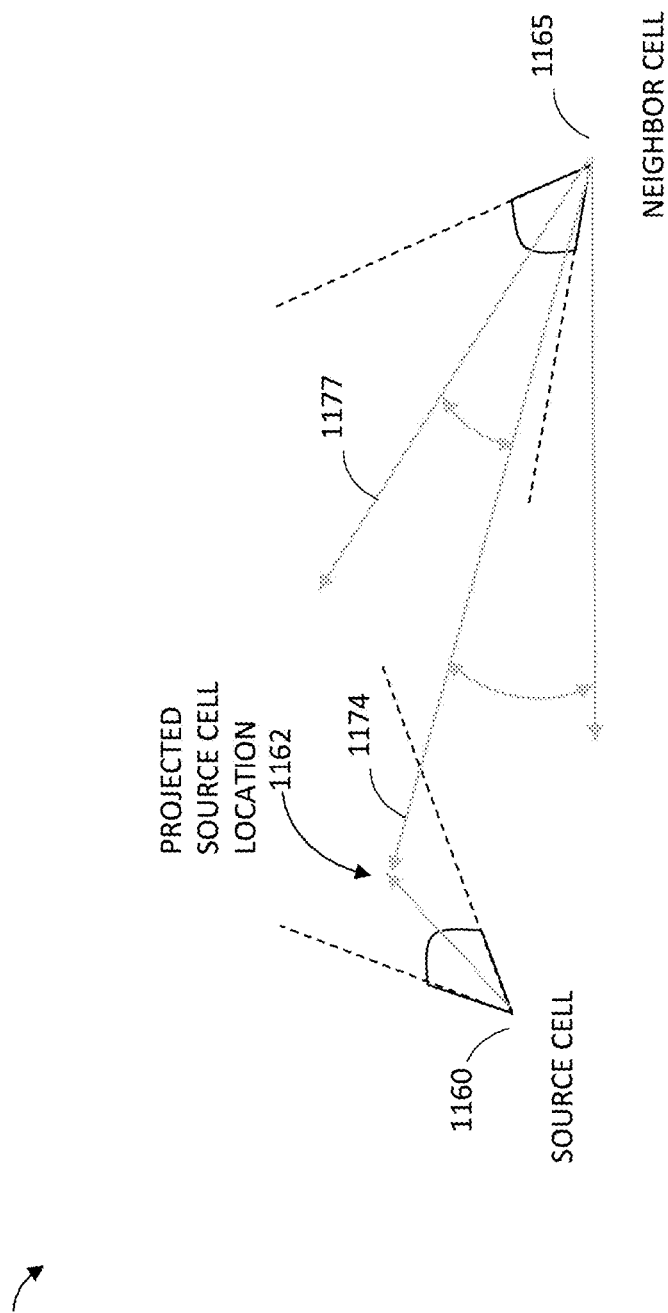
FIG. 11B is a diagram illustrating a radio frequency coupling between a projected location of a source cell and a newly seeded neighbor cell.

As a third example, FIG. 11A is a flow diagram illustrating a method 1100 for calculating a geoscore a coverage distance of a projected location 1162 of a source cell 1160 and a newly seeded neighbor cell 1165, and FIG. 11B illustrates a radio frequency coupling between the projected location 1162 of the source cell 1160 and the newly seeded neighbor cell 1165. The dynamic ANR system 350 may utilize the coverage distance when determining the geoscore for the source cell 1160 (at the projected location 1162) and the neighbor cell 1165. For example, in networks where cells are very close to one another, the dynamic ANR system 350 may project a likely coverage area from which to calculate angles to be used in calculating geoscores for the cells.

In operation 1110, the dynamic ANR system 350 generates a list of all unique non-cosite locations within a radius r, and in operation 1120, determines the average of the n closest sites, which is the regional inter-site distance.

In operation 1130, the dynamic ANR system 350 converts the regional inter-site distance into a regional cell distance by multiplying the regional inter-site distance by sine(50 degrees), in order to determine a max coverage distance from the regional inter-site distance.

In operation 1140, the dynamic ANR system 350 converts the max coverage distance to a coverage distance of x number of cell users (e.g., 50 percent of users), by multiplying the regional cell distance by sqrt (2)/2.

In operation 1150, the dynamic ANR system 350 determines an approximate coverage point by projecting a coverage distance 1162 away from the source cell 1160 along the source cell's azimuth 1172.

The dynamic ANR system 350, therefore, use the approximate coverage point as a coverage distance for the neighbor cell 1165, calculates an azimuth of a vector 1174 between a location of the neighbor cell 1165 and a projected location of the source cell 1162, calculates an absolute value of a difference between the azimuth of the antenna 1177 of the neighbor cell and the azimuth of the vector 1174, and determines a geoscore for the source cell 1160 and the neighbor cell 1165, the geoscore being a cosine of the calculated absolute value of the difference between the azimuth of the antenna 1174 of the neighbor cell and the azimuth of the vector 1170, minus the calculated coverage distance between the projected location of the source cell 1162 and the location of the neighbor cell 1165 multiplied by a pre-determined weighting factor. For example, in FIG. 11B, the geoscore is calculated as cosine(30−0)=0.866−0.45 (4.5 kilometers divided by a tuning factor of 10), or 0.31. Thus, the geoscore indicates that the source cell 116 is aiming towards the neighbor cell.

Of course, the geoscore may be calculated using other techniques that attempt to quantify the relationship between the antennas of the source cells and the neighbor cells.

Referring back to FIG. 8, the dynamic ANR system 350, in operation 820, performs an action that is based on the determined coupling value. For example, the dynamic ANR system 350 may provide the coupling value to an automated network relation process of neighbor seeding running within the telecommunications network, may provide the coupling value to an automated network relation process of blacklisting neighbor cells from neighbor lists running within the telecommunications network, may provide the coupling value to an automated network relation process of augmenting neighbor lists running within the telecommunications network, and so on.

Thus, in some embodiments, the dynamic ANR system 350 may determine a geoscore or other coupling value for a source cell and a neighbor cell within a network, and add or remove the neighbor cell from a neighbor list of the source cell based on the determined geoscore, among other things.

Although aspects of the present technology have been described with respect to specific examples, embodiments of the present technology are not limited by these examples. For example, persons of skill in the art will recognize that pre-delivering content to user devices may be performed according to various other algorithms and processes without departing from the scope or spirit of the present technology.

What is claimed is:

1. A method, comprising:
    determining a coupling value for a source cell and a neighbor cell within a telecommunications network; and
    performing an action that is based on the determined coupling value, wherein determining a coupling value for the source cell and the neighbor cell includes:
        calculating an azimuth of a vector between a location of the source cell and a location of the neighbor cell and an azimuth of an antenna of the source cell;
        calculating an absolute value of a difference between the azimuth of the antenna of the source cell and the azimuth of the vector;
        determining a geoscore for the source and the neighbor cell, the geoscore being a cosine of the calculated absolute value of the difference between the azimuth of the antenna of the source cell and the azimuth of the vector.

2. The method of claim 1, wherein the determined coupling value is a geoscore that quantifies a degree of radio frequency coupling between the source cell and the neighbor cell.

3. The method of claim 1, wherein the determined coupling value is based on an antenna relationship between the source cell and the neighbor cell and based on a coverage area relationship between the source cell and the neighbor cell.

4. The method of claim 1, wherein performing an action that is based on the determined coupling value includes providing the coupling value to an automated network relation process of neighbor seeding running within the telecommunications network.

5. The method of claim 1, wherein performing an action that is based on the determined coupling value includes providing the coupling value to an automated network relation process of blacklisting neighbor cells from neighbor lists running within the telecommunications network.

6. The method of claim 1, wherein performing an action that is based on the determined coupling value includes providing the coupling value to an automated network relation process of augmenting neighbor lists running within the telecommunications network.

7. A method, comprising:
    determining a coupling value for a source cell and a neighbor cell within a telecommunications network; and
    performing an action that is based on the determined coupling value, wherein determining a coupling value for the source cell and the neighbor cell includes:
        calculating a distance between a location of the source cell and a location of the neighbor cell;
        calculating an azimuth of a vector between a location of the neighbor cell and a location of the source cell;
        calculating an absolute value of a difference between the azimuth of the antenna of the neighbor cell and the azimuth of the vector; and
        determining a geoscore for the source and the neighbor cell, the geoscore being a cosine of the calculated absolute value of the difference between the azimuth of the antenna of the neighbor cell and the azimuth of the vector, minus the calculated distance between the location of the source cell and the location of the neighbor cell multiplied by a pre-determined weighting factor.

8. A non-transitory computer-readable storage medium whose contents, when executed by a computing system, cause the computing system to perform operations within running automated neighbor relation optimization processes, the operations comprising:
    determining a coupling value for a source cell and a neighbor cell within a telecommunications network; and
    performing an action that is based on the determined coupling value, wherein determining a coupling value for the source cell and the neighbor cell includes:
        calculating an azimuth of a vector between a location of the source cell and a location of the neighbor cell and an azimuth of an antenna of the source cell;
        calculating an absolute value of a difference between the azimuth of the antenna of the source cell and the azimuth of the vector;
        determining a geoscore for the source and the neighbor cell, the geoscore being a cosine of the calculated absolute value of the difference between the azimuth of the antenna of the source cell and the azimuth of the vector.

9. The computer-readable storage medium of claim 8, wherein the determined coupling value is a geoscore that quantifies a degree of radio frequency coupling between the source cell and the neighbor cell.

10. The computer-readable storage medium of claim 8, wherein the determined coupling value is based on an antenna relationship between the source cell and the neighbor cell and based on a coverage area relationship between the source cell and the neighbor cell.

11. The computer-readable storage medium of claim 8, wherein performing an action that is based on the determined coupling value includes providing the coupling value to an automated network relation process of neighbor seeding running within the telecommunications network.

12. The computer-readable storage medium of claim 8, wherein performing an action that is based on the determined coupling value includes providing the coupling value to an automated network relation process of blacklisting neighbor cells from neighbor lists running within the telecommunications network.

13. The computer-readable storage medium of claim 8, wherein performing an action that is based on the determined coupling value includes providing the coupling value to an automated network relation process of augmenting neighbor lists running within the telecommunications network.

* * * * *